United States Patent
Pietsch et al.

(10) Patent No.: US 10,012,971 B2
(45) Date of Patent: Jul. 3, 2018

(54) SYSTEM, RETROFIT MODULE AND METHOD FOR MONITORING A CURRENT OPERATIONAL STATE OF A PROGRAM-CONTROLLED DOMESTIC APPLIANCE

(71) Applicant: BSH HAUSGERÄETE GMBH, Munich (DE)

(72) Inventors: Ingo Pietsch, Munich (DE); Mirco Winde, Munich (DE); Thomas Garbe, Ottobrunn (DE)

(73) Assignee: BSH Hausgeraete GmbH, Munich (DE)

( * ) Notice: Subject to any disclaimer, the term of this patent is extended or adjusted under 35 U.S.C. 154(b) by 171 days.

(21) Appl. No.: 15/022,276

(22) PCT Filed: Aug. 25, 2014

(86) PCT No.: PCT/EP2014/067984
§ 371 (c)(1),
(2) Date: Mar. 16, 2016

(87) PCT Pub. No.: WO2015/036229
PCT Pub. Date: Mar. 19, 2015

(65) Prior Publication Data
US 2016/0231723 A1    Aug. 11, 2016

(30) Foreign Application Priority Data
Sep. 16, 2013 (DE) .......... 10 2013 218 468

(51) Int. Cl.
*G05B 13/00*    (2006.01)
*G05B 19/048*    (2006.01)
(Continued)

(52) U.S. Cl.
CPC ........ *G05B 19/048* (2013.01); *A47L 15/0063* (2013.01); *D06F 33/02* (2013.01);
(Continued)

(58) Field of Classification Search
CPC ... G05B 19/048; A47L 15/0063; D06F 33/02; D06F 39/005
See application file for complete search history.

(56) References Cited

U.S. PATENT DOCUMENTS 6,778,868 B2    8/2004 Imamura et al.
9,538,311 B2 *  1/2017 Baum ................. H04L 63/0807
(Continued)

FOREIGN PATENT DOCUMENTS

CN    1343808 A    4/2002
DE    102004021019 A1    11/2005
(Continued)

OTHER PUBLICATIONS

Zidat, Farid, et al. Non Invasive Sensors for Monitoring the Efficiency of AC Electrical Rotating Machines, sensors ISSN 1424-8220, www.mdpi.com/journal/sensors.

*Primary Examiner* — Vincent Tran
(74) *Attorney, Agent, or Firm* — Laurence A. Greenberg; Werner H. Stemer; Ralph E. Locher

(57) ABSTRACT

A current operational state of a program-controlled domestic appliance is monitored while it carries out an operating process. The monitoring system includes a retrofit module and a communication device separate from the retrofit module and from the domestic appliance. The retrofit module has a fastening arrangement for releasable fastening on an outer face of an appliance housing, a data exchange unit for wireless communication, and a sensor arrangement with a magnetic field sensor that detects a magnetic field that is generated by a drive motor of the domestic appliance and
(Continued)

that penetrates outwards through the appliance housing. The system determines the current operational state of the domestic appliance with the aid of detected measured values of the magnetic field and outputs the state via the communication device.

18 Claims, 2 Drawing Sheets

(51) Int. Cl.
    *A47L 15/00*           (2006.01)
    *D06F 39/00*           (2006.01)
    *D06F 33/02*           (2006.01)
    *G05B 15/02*           (2006.01)
    *G05B 19/042*          (2006.01)
    *D06F 39/12*           (2006.01)
    *D06F 58/28*           (2006.01)

(52) U.S. Cl.
    CPC ........... *D06F 39/005* (2013.01); *G05B 15/02* (2013.01); *G05B 19/0428* (2013.01); *A47L 15/0049* (2013.01); *A47L 2401/12* (2013.01); *A47L 2401/18* (2013.01); *A47L 2401/30* (2013.01); *A47L 2401/32* (2013.01); *A47L 2501/26* (2013.01); *A47L 2501/265* (2013.01); *D06F 39/12* (2013.01); *D06F 58/28* (2013.01); *D06F 2058/2854* (2013.01); *D06F 2202/04* (2013.01); *D06F 2202/12* (2013.01); *D06F 2204/10* (2013.01); *D06F 2210/00* (2013.01); *D06F 2216/00* (2013.01); *G05B 2219/24015* (2013.01); *G05B 2219/2633* (2013.01)

(56) References Cited

U.S. PATENT DOCUMENTS

| | | | | |
|---|---|---|---|---|
| 2004/0139803 | A1* | 7/2004 | Robinson | G01H 11/06 73/650 |
| 2009/0066197 | A1* | 3/2009 | Chen | F04D 25/0606 310/68 B |
| 2009/0069671 | A1* | 3/2009 | Anderson | A61B 5/06 600/424 |
| 2011/0130887 | A1* | 6/2011 | Ehlers, Sr. | F25B 49/005 700/296 |
| 2011/0180118 | A1 | 7/2011 | Schrott | |
| 2011/0246124 | A1* | 10/2011 | Lill | G05B 19/0428 702/141 |
| 2012/0236820 | A1 | 9/2012 | Park et al. | |
| 2013/0149056 | A1* | 6/2013 | Appel | B23Q 11/0071 408/58 |
| 2013/0185079 | A1* | 7/2013 | Park | D06F 33/02 704/275 |

FOREIGN PATENT DOCUMENTS

| | | |
|---|---|---|
| DE | 102005019377 A1 | 11/2006 |
| DE | 102010015643 A1 | 10/2011 |
| DE | 102010063134 A1 | 6/2012 |
| DE | 102011076181 A1 | 11/2012 |
| DE | 102011077572 A1 | 12/2012 |
| EP | 1186695 A2 | 3/2002 |
| KR | 100762145 B1 | 10/2007 |
| KR | 1020080019382 A | 3/2008 |
| KR | 1020110055538 A2 | 5/2011 |

\* cited by examiner

SYSTEM, RETROFIT MODULE AND METHOD FOR MONITORING A CURRENT OPERATIONAL STATE OF A PROGRAM-CONTROLLED DOMESTIC APPLIANCE

BACKGROUND OF THE INVENTION

Field of the Invention

The invention relates to a system for monitoring a current operational state of a program-controlled domestic appliance while the domestic appliance carries out an operating process, which system comprises a retrofit module and a communication device which is separate from the retrofit module and the domestic appliance, wherein the retrofit module comprises a fastening arrangement for releasable fastening of the retrofit module on an outer face of an appliance housing of the domestic appliance, a data exchange unit for wireless communication with the communication device and a sensor arrangement which is designed to detect at least one emission signal from a component of the domestic appliance carrying out the operating process of the domestic appliance, said signal penetrating outwards through the appliance housing. The system is designed to determine the current operational state of the domestic appliance with is the aid of detected measured values of the emission signal and to output said state by means of the communication device. Furthermore, the invention relates to a retrofit module for such a system and a method for monitoring a current operational state of a program-controlled domestic appliance.

It is already the prior art to connect a domestic appliance to a wireless local network, in particular a WLAN network, using communication technology. Via such a network the domestic appliance can, for example, communicate with other appliances which are likewise connected to the network. On the other hand, communication which can be performed by means of an access point or a WLAN router is possible between the domestic appliance and an internet server. For example, within the context of this communication, status data can be transmitted from the domestic appliance to the internet server which can then be transmitted from the internet server to an internet-ready communications terminal. For example, the user of the domestic appliance can access the status data which is stored on the internet server with his smartphone. The status data may, for example, comprise information about an operating process of the domestic appliance, such as in particular a remaining period of time required to complete the operating process or information to the effect that the operating process—for example, a washing cycle—has already been completed. Within the context of this communication, if necessary the operation of the domestic appliance using the portable communications terminal—for example, the aforementioned smartphone—can also be enabled.

Furthermore, the prior art includes the preparation of a wireless communications link directly between the domestic appliance and a portable communication device avoiding the home network. This direct communication can, for example, take place by means of an NFC link (Near Field Communication). Here too, on the one hand, status data of the domestic appliance can be transmitted to the portable communications terminal transmitted; on the other hand, control commands can also be transmitted from the portable communications terminal to the domestic appliance. Such a method for the control of a television or an air-conditioning system is known, for example, from the document US 2012/0236820 A1. Here a is communications link is first established between a cellphone and the television using the NFC communication standard. After establishment of this communications link, further communication takes place by means of a secondary network such as, for example, a WLAN network.

The communication between the domestic appliance and an external device such as, for example, a smartphone or a tablet PC or an internet server, therefore presupposes that the domestic appliance itself has a corresponding communication device which serves to perform this communication. Such communication is therefore not possible for domestic appliances without such a communication device. In the case of domestic appliances which do not have a communication device, the user must inform themselves about the current operational state of the domestic appliance such as, for instance, about the remaining time of a wash, in the conventional manner on the domestic appliance itself.

A retrofit module as described in the document DE 10 2005 019 377 A1 provides some redress here. For remote monitoring of the operational state of a domestic appliance a retrofit module is proposed here which has sensors which, for example, register vibration, operating noise and visually perceptible movements of the domestic appliance. Depending on these measured values, an actual operating profile of the domestic appliance is then established and compared with a reference operating profile. The retrofit module can have a corresponding communications interface by means of which the current operational state of the domestic appliance is transmitted to an external device.

A device with a sensor unit and a data transmission unit is known from the document DE 10 2011 076 181 A1 which is specially designed for a saucepan. The sensor unit is fastened on the inside of the wall of the saucepan while the data transmission unit is fastened on the outer face of the wall and thus opposite the sensor unit. The sensor unit measures the temperature inside the saucepan and transmits the measured temperature values to the data transmission unit by means of a magnetic field.

A particular challenge lies in distinguishing the emission signals emitted by the domestic appliance itself from other signals which are not caused by the domestic appliance itself but by other events in the vicinity of the domestic appliance. This applies, in particular, to the detection of vibrations or noise. Thus, for example, the sound of a person's footsteps going past the domestic appliance may result in this signal being interpreted as an emission signal from the domestic appliance. This leads to errors in establishing the current operational state of the domestic appliance. This has a particular effect on the detection of the completion of a washing cycle in the case of a washing machine. It is conceivable that even after the program has finished vibration signals are detected from interfering sources which are wrongly interpreted as further operation of the domestic appliance. In such situations the end of the program cannot be accurately detected.

BRIEF SUMMARY OF THE INVENTION

It is the task of the invention to find a way in which monitoring of the current operational state of the domestic appliance can be performed particularly plausibly with a system of the aforementioned kind.

This object is achieved according to the invention by a system, by a retrofit module, and also by a method with features in accordance with the respective independent claim. The dependent claims, the description and the figures relate to advantageous embodiments of the invention.

A system according to the invention is designed to monitor the current operational state of a program-controlled domestic appliance when executing an operating process by the domestic appliance. The system comprises a retrofit module and a communication device which is separate from the retrofit module and the domestic appliance. The retrofit module comprises a fastening arrangement, a sensor arrangement and a data exchange unit. The fastening arrangement is designed for releasable fastening of the retrofit module on an outer face of an appliance housing of the domestic appliance. The data exchange unit is for wireless communication with the communication device, namely in particular directly and/or by means of an internet server. The sensor arrangement is designed to detect at least one emission signal penetrating the appliance housing to the outside, which is generated by a component of the domestic appliance carrying out the operating process of the domestic appliance. The system determines the current operational state of the domestic appliance with the aid of detected measured values of the emission signal and outputs the current operational state by means of the communication device. According to the invention, it is envisaged that the sensor arrangement of the retrofit module comprises a magnetic field sensor which is designed for detecting a magnetic field, generated by a drive motor as a component of the domestic appliance, as an emission signal.

The invention takes advantage of the fact that the domestic appliances of today—in particular, large domestic appliances, such as for example, appliances for laundry care—usually have an electrical drive motor in the shape of a synchronous machine or a brushless direct current motor (BLDC). The stator of such a drive motor has electromagnets which generate a rotating magnetic field which can also be detected through the appliance housing during operation of the domestic appliance. The detection of the magnetic field enables particularly plausible and reliable determination of the current operational state of the domestic appliance. Namely, it is highly unlikely that there are also other magnetic field sources in the vicinity of the domestic appliance which might interfere with the detection of the magnetic field of the drive motor. If an external magnetic field is detected by the magnetic sensor, it can therefore be determined with a very high degree of probability that the magnetic field is an emission signal of the domestic appliance itself. Errors in determining the operational state can therefore be excluded. Furthermore, the detection of the magnetic field has the advantage that it enables conclusions to be drawn about the current operational state of the domestic appliance with ease. It is thus possible to detect whether the drive motor is turning in the first place or not. In this way, for example, the end of the operating process of the domestic appliance can be detected and output by means of the communication device. It is also possible to draw conclusions about further operational states. Thus, with the aid of the magnetic field, if necessary, even the rotational speed of the drive motor can be reliably determined and this in turn indicates the progress of the program. The magnetic field generated by the drive motor is namely a rotating field with a predefined rotation frequency which is evaluated by the system and can be evaluated in terms of the progress of the program and/or with regard to possible operational errors of the domestic appliance.

The domestic appliance is therefore a program-controlled domestic appliance. In particular, this may mean that a multiplicity of operating programs which can be selected by the user are stored in the domestic appliance. The operating process is then performed in accordance with the selected operating program. The domestic appliance is preferably a large domestic appliance, such as in particular an appliance for laundry care or a dishwasher. An appliance for laundry care may be, for example, a washing machine, a washer-dryer or a tumble dryer.

The retrofit module may, for example, have a module housing, in which the sensor arrangement and data exchange unit components are housed. It is therefore an enclosed module which can be fastened on the outer face of the appliance housing and in particular, does not perform any data communications with the domestic appliance. The retrofit module must therefore be arranged completely independently of the domestic appliance and completely outside the domestic appliance to avoid anything having to be changed on the domestic appliance itself. The system preferably also manages without detection of the electrical current of the domestic appliance. The retrofit module may contain an internal energy storage unit to supply energy, such as, for example, a rechargeable battery. However, a battery-operated retrofit module may also be provided. Additionally or alternatively, a power connection by means of which the retrofit module can be connected to a conventional socket may also be provided.

It proves particularly advantageous if, in addition to the magnetic field sensor, the sensor arrangement of the retrofit module has at least one additional sensor which is designed to detect an emission signal which is different from the magnetic field of a component of the domestic appliance. The operational state of the domestic appliance is then also determined taking into consideration measured values detected by the at least one additional sensor. On the one hand, the detection of at least one additional emission signal of the domestic appliance has the advantage of additional plausibilization; on the other hand, the detection of several emission signals also enables the precise determination of additional operational states of the domestic appliance.

The possible use of a combination of the magnetic field sensor and an acceleration sensor which is designed to detect acceleration as an emission signal is particularly preferable. The system can then also determine the operational state of the domestic appliance taking into consideration the acceleration. The acceleration signal enables particularly accurate conclusions to be drawn about a multiplicity of operational states of the domestic appliance. Thus, with the aid of such an emission signal an operational error of the domestic appliance and/or the current program progress can also be detected.

Additionally or alternatively, the sensor arrangement of the retrofit module may also comprise an acoustic sensor for the detection of a structure-borne sound and/or an airborne sound as an emission signal. The system may then also determine the operational state of the domestic appliance taking into consideration the structure-borne sound and/or the airborne sound. A microphone, for example, can be used as an acoustic sensor. The detection of the structure-borne sound and/or the airborne sound also offers additional opportunities for further plausibilization and/or determination of further operational states of the domestic appliance. In particular, the use of a microphone has the advantage of enabling acoustic operating sounds of the domestic appliance which are output by means of a loudspeaker of the domestic appliance to be detected. Such operating sounds are usually output after the end of the operating process and inform the user about the proper completion of the operating process. Such sounds can now be detected by the retrofit module and for example, evaluated to the effect that the operating process has been completed. This information can then be output by means of the communication device of the system.

Furthermore, additionally or alternatively, the sensor arrangement of the retrofit module may also comprise a temperature sensor which is designed to detect a temperature to which the outer face of the appliance housing is exposed. The temperature sensor can either detect the ambient temperature in the immediate vicinity of the outer wall of the domestic appliance or a temperature directly on the outer face of the outer wall of the appliance housing. The system can then also determine the operational state of the domestic appliance taking the temperature into consideration. The detection of the current temperature proves particularly advantageous in detecting operating errors of the domestic appliance in which the temperature of the domestic appliance, for example, exceeds certain threshold values. If such operational errors are detected, this can be signaled by means of the communication device. Furthermore, through detection of the current temperature it is also possible, for example, to distinguish between a washing cycle and a spinning program of a washing process of a washing machine. This can, for example, support the ascertainment of the progress of the current program.

With regard to the evaluation of the measured values of the sensor arrangement and the determination of the current operational state of the domestic appliance, the following embodiments may be envisaged:

On the one hand, the evaluation of the measured values can take place in the retrofit module itself. With the aid of the measured values of the at least one emission signal, the retrofit module can therefore determine the operational state of the domestic appliance itself and transmit this to the communication device. A corresponding evaluation device in the form of a digital signal processor can be used for this purpose in the retrofit module. This embodiment has the advantage of enabling the detected operational state of the domestic appliance to also be transmitted directly, for example, to a smartphone as a communication device, using a local network without any additional data processing being required in the communication device itself.

On the other hand, additionally or alternatively, however, it may also be envisaged that the measured values of the at least one emission signal are transmitted to the communication device and/or an internet server by means of the data exchange unit of the retrofit module. The communication device (for example, smartphone or tablet PC or a traditional PC) and/or the internet server can then determine the current operational state of the domestic appliance with the aid of the received measured values. This embodiment in turn has the advantage that more complex signal processing algorithms which require greater computing power can also be implemented here. Furthermore, this embodiment also offers update options.

It is particularly advantageous if the sensor arrangement of the retrofit module has at least one additional sensor in addition to the magnetic field sensor and the system, in particular the retrofit module itself, has a plausibilization device which checks whether these emission signals originate from the domestic appliance on the basis of a comparison of the magnetic field with the emission signal of the at least one additional sensor. These emission signals can then be used solely for further determination of the current operational state after successful assignment to the domestic appliance. By comparing two different emission signals, it can therefore be determined whether these emission signals were actually output by the domestic appliance itself or are signals from external interfering sources. The probability of an error in determining the current operational state of the domestic appliance can thus be reduced to a minimum.

It is also possible to filter the detected emission signals. This filtering can also be implemented in the retrofit module itself. Thus, for example, emission signals from other interfering sources can be filtered out.

The communication device is preferably a portable terminal which communicates directly with the retrofit module and/or by means of an internet server. The portable terminal may, for example, be a smartphone or tablet PC. This embodiment takes advantage of the fact that nowadays almost everyone has a cell phone with a display, rendering the use of additional appliances with their associated disadvantages superfluous. A mobile terminal is here understood to mean a portable communications terminal which is designed for wireless communication in accordance with a predefined communication standard and on which new applications can be installed and then executed.

The system—whether it is the retrofit module itself, the internet server or the communication device—can determine the current operational state of the domestic appliance preferably on the basis of a comparison of the measured values of the magnetic field and/or at least one emission signal which is different from the magnetic field and has stored reference values. The reference values may involve, for example, temporal reference progressions of the respective emission signal which are then compared to the temporal progression of the emission signal actually detected. The currently selected operating program of the domestic appliance, for example, can be determined with the aid of such a comparison, as well as the progress of the program.

One embodiment envisages that with the aid of a comparison of the measured values of the magnetic field and/or at least one emission signal which is different from the magnetic field and has stored reference values, the system can detect an operational error of the domestic appliance as an operational state and signal this by means of the communication device. In this way, the user can be informed about the operational error of the domestic appliance and thus, if necessary, take corresponding security measures.

With regard to the operational state, the following embodiments may be envisaged: with the aid of the measured values of the magnetic field and/or at least one emission signal which is different from the magnetic field, a currently selected operating program of the domestic appliance may be detected as an operational state. Additionally or alternatively, the completion of the operating process can also be detected as an operational state.

Furthermore, additionally or alternatively, the progress of the program and/or a remaining period of the operating process can also be determined as an operational state which is still required for completion of the operating process. All these parameters enable user-friendly and information-rich remote monitoring of the operating process of the domestic appliance.

In order to be able to fasten the retrofit module to the appliance housing of the domestic appliance reliably, the fastening arrangement may have a magnet, for example, a permanent magnet, and/or a suction cup or suction foot for releasable fastening of the retrofit module to the domestic appliance. All in all, the retrofit module may therefore be fastened on the appliance housing of the domestic appliance in a non-destructively releasable manner and in a reversibly releasable manner.

Preferably the system serves to monitor the current operational state of a domestic appliance for laundry care and/or a dishwasher. Precisely these domestic appliances usually include a drive motor which generates a rotating magnetic field during operation of the domestic appliance.

Furthermore, the invention relates to a retrofit module for a system according to the invention, with a fastening arrangement which is designed for releasable fastening of the retrofit module to an outer face of an appliance housing of a domestic appliance, with a sensor arrangement which is designed to detect at least one emission signal penetrating outwards through the appliance housing from a component of the domestic appliance carrying out the operating process of the domestic appliance, and with a data exchange unit for wireless communication with an external appliance which is separate from the retrofit module and the domestic appliance. This external appliance can be the aforementioned communication device and/or the likewise aforementioned internet server. The sensor arrangement comprises a magnetic field sensor which is designed to detect a magnetic field which is generated by a drive motor as a component of the domestic appliance as an emission signal. The retrofit module can transmit the detected measured values of the magnetic field by means of the data exchange unit to the external appliance to determine the current operational state of the domestic appliance and/or itself determine the operational state of the domestic appliance with the aid of the measured values and transmit this to the external appliance.

A method according to the invention serves to monitor a current operational state of a program-controlled domestic appliance while the domestic appliance carries out an operating process, wherein a retrofit module with a sensor arrangement, a data exchange unit and a fastening arrangement is provided and fastened on an outer face of an appliance housing of the domestic appliance by means of the fastening arrangement, wherein by means of the sensor arrangement of the retrofit module at least one emission signal of the domestic appliance is detected, and wherein by means of the data exchange unit the retrofit module communicates wirelessly with a communication device separate from the retrofit module and the domestic appliance. By means of a magnetic sensor of the sensor arrangement, a magnetic field of a drive motor of the domestic appliance is detected, and with the aid of detected measured values of the magnetic field the current operational state of the domestic appliance is determined and output by means of the communication device. This determination can take place in the retrofit module and/or the communication device and/or an internet server.

The preferred embodiments and their advantages presented with regard to the system according to the invention apply accordingly to the retrofit system according to the invention and to the method according to the invention.

Additional features of the invention are set out in the claims, the figures and the figure description. All the aforementioned features and combinations of features specified in the description and the features and combinations of features referred to hereinafter in the figure description and/or only shown in the figures can be used not only in the combination respectively specified, but also in other combinations or taken in isolation.

The invention is now explained in more detail with the aid of a preferred exemplary embodiment as well as with reference to the attached drawings.

There is shown:

DESCRIPTION OF THE INVENTION

Figure 1:
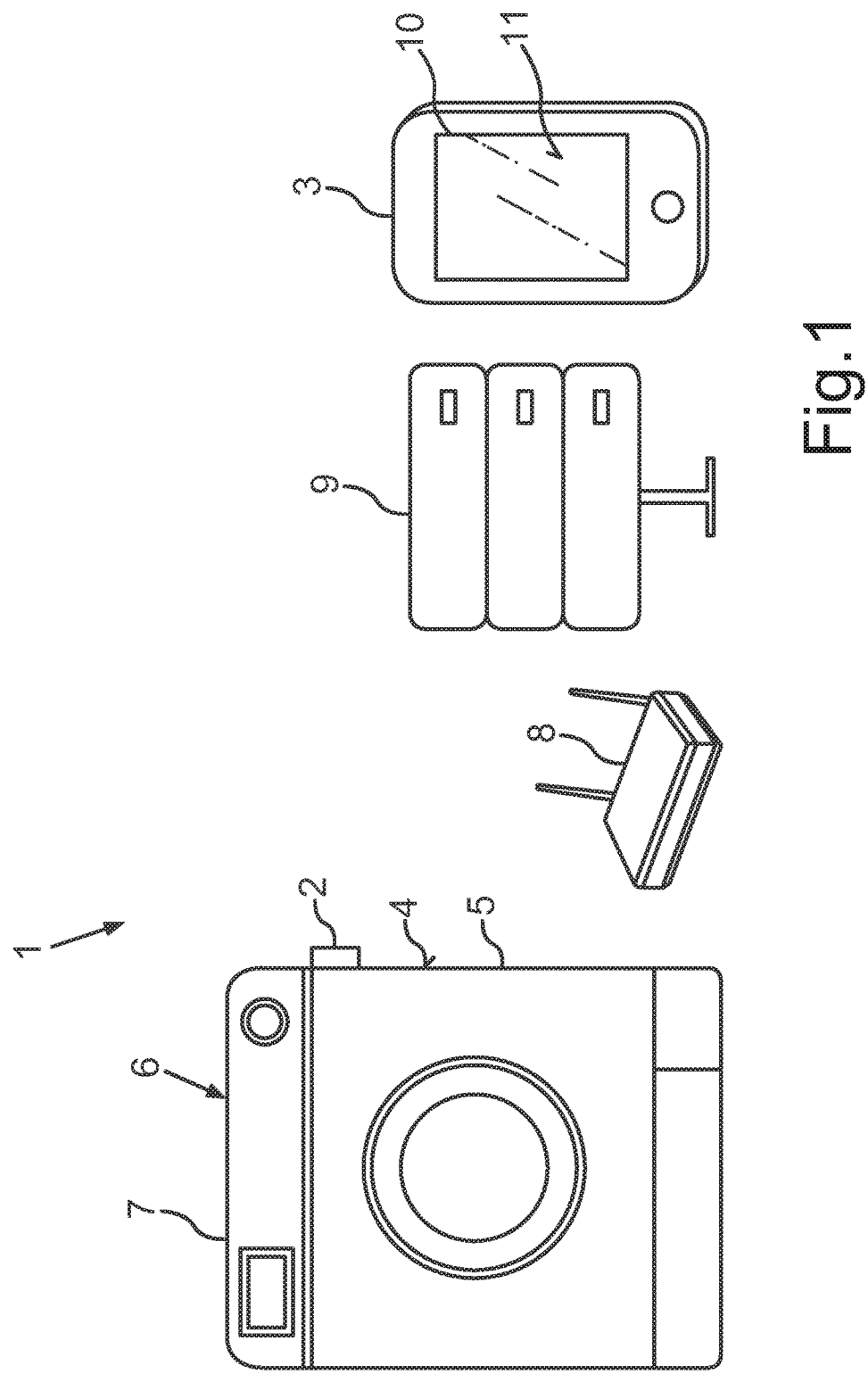
FIG. 1 A diagrammatic view of a system in accordance with an embodiment of the invention.

A system 1 shown in FIG. 1 contains a retrofit module 2 and a communication device 3, which is designed as a smartphone in the exemplary embodiment. The retrofit module 2 can be fastened in a reversibly releasable manner on an outer face 4 of an outer wall 5 of an appliance housing 6 of a domestic appliance designated overall by 7. In the exemplary embodiment the domestic appliance 7 is a washing machine. The retrofit module 2 communicates with an internet server 9 by means of a WLAN router 8 and by means of the internet server 9 with the communication device 3. As a means of output, the communication device 3 has a display 10 which is designed as a touchscreen and has a touch-sensitive surface 11 by means of which operator entries can be made on the communication device 3. By means of the display 10, operational states of the domestic appliance 7 can be output which are determined with the aid of measured values which are detected by means of sensors of the retrofit module 2.

Figure 2:
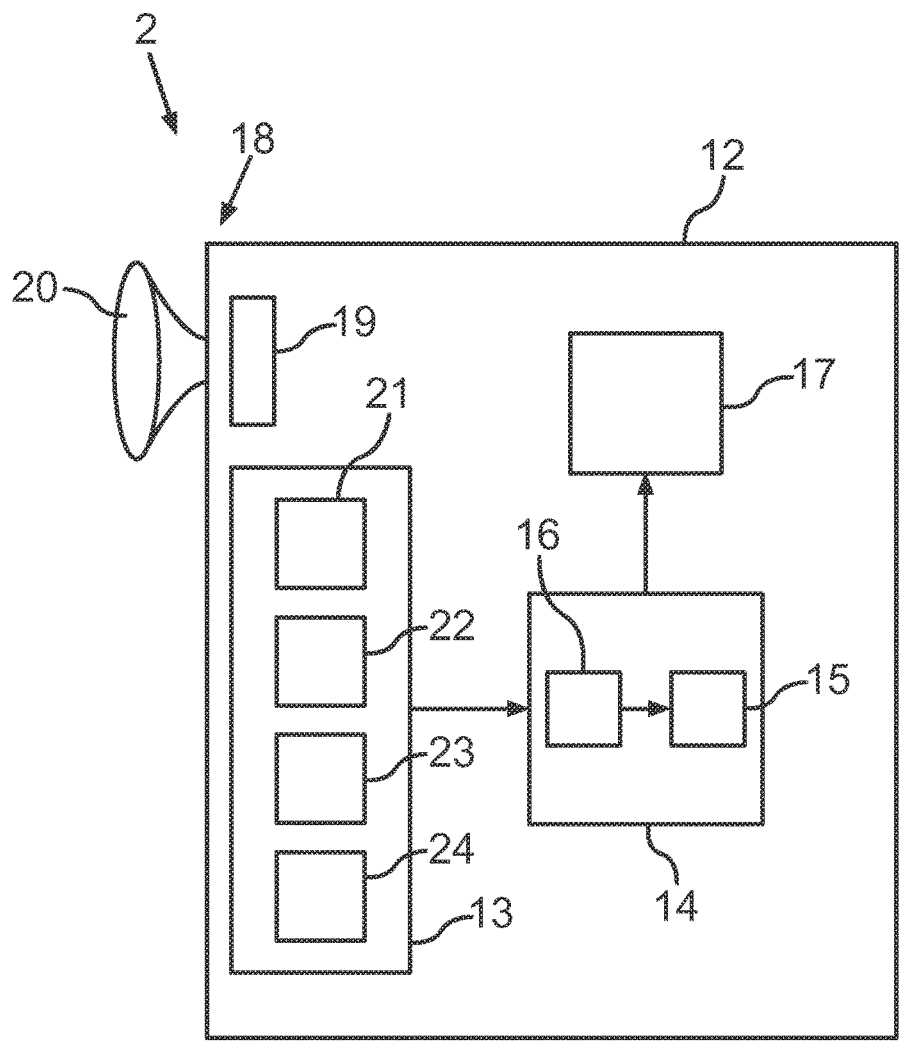
FIG. 2 A diagrammatic view of a block diagram of a retrofit module in accordance with an embodiment of the invention.

FIG. 2 shows a block diagram of the retrofit module 2 in accordance with an embodiment of the invention. In the enclosed housing 12 of the retrofit module 2, a sensor arrangement 13 is found which serves to detect emission signals which are output from the domestic appliance 7 by means of the appliance housing 6. The sensor arrangement 13 is electrically connected to a calculation device 14 which may contain an evaluation device 15 and optionally a plausibilization device 16. The calculation device 14 may be provided in the form of a shared digital signal processor so that the plausibilization device 16 and the evaluation device 15 are quasi formed by the same signal processor. The calculation device 14 is connected to a data exchange unit 17 which is designed to communicate with the internet server 9. The data exchange unit 17 can operate as additionally or alternatively to direct communication with the communication device 3, for example, via the WLAN network.

Furthermore, the retrofit module 2 has a fastening arrangement 18 which is for releasable fastening of the retrofit module 2 on the appliance housing. The fastening arrangement 18 may comprise a magnet 19 and/or a suction cup 20 in order to be able to fasten the retrofit module 2 to the appliance housing 6.

The sensor arrangement 13 comprises a magnetic field sensor 21. Optionally, the sensor arrangement 13 also comprises an acceleration sensor 22. Furthermore, the sensor arrangement 13 may also optionally comprise an acoustic sensor 23 and/or a temperature sensor 24. The measured values of all the sensors 21, 22, 23, 24 are transmitted to the calculation device 14 for processing.

It may be envisaged that the calculation device 14 can detect the current operational state of the domestic appliance 7 with the aid of the measured values. Additionally or alternatively, it may also be envisaged that an operational state of the domestic appliance 7 is determined by the internet server 9 and/or the communication device 3.

Regardless of the location or the appliance in which the operational state of the domestic appliance 7 is detected, this operational state is then output by the communication device 3, namely in particular via the display 10. A corresponding application can be installed on the communication device 3 for this purpose.

If the operational state is determined in the retrofit module 2 itself, then the evaluation device 15 assumes this task. On the basis of a comparison of the magnetic field with at least one further emission signal, the plausibilization device 16 has the task of establishing whether these emission signals originate from the domestic appliance 7 itself or rather from other interfering sources. These emission signals are only forwarded to the evaluation device 15 if it is detected that the signals are coming from the domestic appliance 7. This can take the form, for example, of the plausibilization device 16 being used to check whether a rotation of the washing drum can be detected both with the aid of the magnetic field and with the aid of the other emission signal.

All in all, the evaluation device 15 therefore receives the following emission signals: the magnetic field from the magnetic field sensor 21, the acceleration from the acceleration sensor 22, the acoustic signal from the acoustic sensor 23 and the temperature from the temperature sensor 24. From these variables the evaluation device 15 can determine the following operational states of the domestic appliance 7:

An operational error of the domestic appliance 7 and/or
A currently selected operating program of the domestic appliance 7 and/or
The progress of a program and/or the remaining time of the operating process, here of a washing process.

The operational error of the domestic appliance 7 is detected by comparing the measured values of at least one of the sensors 21 to 24 with stored reference values. If deviations are established, an operational error can then be deduced.

The detection of the completion of the operating process or the end of the program may, for example, take the form of the evaluation device 15 checking whether a magnetic field is detected by the magnetic field sensor 21 and/or acceleration by the acceleration sensor 22 and/or sound by the acoustic sensor 23 for a predetermined period. If no signal is detected during this predetermined period, it may be assumed that the operating process has already ended.

Determining the progress of the program and/or the remaining time and/or the selected operating program can take the form of the detected measured values or the temporal progressions of these measured values being compared with stored reference values or reference progressions. Such reference progressions may, for example, be stored in advance in the retrofit module 2 for each operating program of the domestic appliance 7.

The detected operational state of the domestic appliance 7 is then transmitted to the communication device 2 and output there by means of the display 10.

The installation site of the retrofit module depends on the installation of the respective domestic appliance 7 at its location. The installation site should be chosen in such a way that the emission signals to be measured can be detected by the sensor arrangement 13 while on the other hand, wireless signal transmission by means of the data exchange unit 17 is not shielded by the housing 6 of the domestic appliance 7.

The data exchange unit 17 can communicate in accordance with at least one of the following communication standards: the WLAN communication standard and/or the Bluetooth communication standard and/or the NFC communication standard (Near Field Communication). Thus, on the one hand, direct communication with the communication device 3 is possible and on the other hand, communication with the internet server 9.

The retrofit module 2 may have its own energy source for electrical power, such as for example, a battery, an accumulator or the like, and/or a power connection by means of which the retrofit module 2 can be connected to a traditional socket.

If, for example, the retrofit module 2 is attached to a tumble dryer or a washing machine or a washer-dryer, the evaluation device 15 can detect the movement of the washing drum with the aid of the emission signals. If unexpected signals occur during the operation of the operating process which, for example, are indicative of incorrect loading or faulty machine components, the user can be informed of this on his mobile communication device 3. Furthermore, the user can also be informed about the progress of the program or the remaining time. After the drying process or the washing process has been completed, the retrofit module 2 also detects the stoppage of the washing drum and/or the acoustic signals output by the domestic appliance 7 and informs the user thereof by means of the communication device 3. In this application example, the top side or the side walls of the domestic appliance 7 are suitable locations on the retrofit module.

If the retrofit module 2 is fastened to a dishwasher, for example, the module 2 can detect the movement of the spray arm and/or the pump during use. Here, the evaluation device 15 can, for example, detect the vibrations of the pump and/or acoustic signals and/or the magnetic field of a motor. Furthermore, by means of the acoustic sensor 23, which constitutes a sonic sensor, noises which indicate a malfunction can be detected. These errors can be reported via the communication device 3. An error may, for example, involve faulty positioning of pieces of crockery, which is associated with the spray arm knocking against the pieces of crockery. As with the washing machine, here too information about the progress of the program is possible with the aid of suitable logical information processing. The user can be informed about this on his communication device 3. At the end of the rinsing process, the retrofit module 2 detects the stoppage of the spray arm or the pump and/or the acoustic signals output by the domestic appliance 7 and informs the user by means of the communication device 3.

LIST OF REFERENCE CHARACTERS

1 System
2 Retrofit module
3 Communication device
4 Outer face
5 Outer wall
6 Appliance housing
7 Domestic appliance
8 WLAN router
9 Internet server
10 Display
11 Surface
12 Housing
13 sensor arrangement
14 Computing device
15 Evaluation device
16 Plausibilization device
17 Data exchange unit
18 Fastening arrangement
19 Magnet 20 Suction cup
21 Magnetic field sensor
22 Acceleration sensor
23 Acoustic sensor
24 Temperature sensor

The invention claimed is:

1. A system for monitoring a current operational state of a program-controlled domestic appliance while the domestic appliance is carrying out an operating process, the domestic appliance having an appliance housing and a drive motor, the system comprising:
a retrofit module;
a communication device that is separate from said retrofit module and from the domestic appliance;
said retrofit module including:
a fastening arrangement for releasable fastening said retrofit module on an outer face of the appliance housing of the domestic appliance;
a data exchange unit for wireless communication with the communication device;
a sensor arrangement with a magnetic field sensor configured for detecting a magnetic field generated by the drive motor of the domestic appliance, the magnetic field forming an emission signal penetrating outwards through the appliance housing; and
a plausibilization device configured to check whether the emission signals originate from the domestic appliance based on a comparison of the detected magnetic field and at least one emission signal different from the magnetic field, and to take the emission signals as a basis for determining the current operational state only after assignment to the domestic appliance; and
wherein the system is configured to determine the current operational state of the domestic appliance by way of detected measured values of the emission signal and to output the current operational state by way of said communication device.

2. The system according to claim 1, wherein said sensor arrangement of said retrofit module comprises at least one further sensor configured to detect an emission signal different from the magnetic field of a component of the domestic appliance carrying out the operating process, and wherein the system is configured to determine the operational state of the domestic appliance also taking into consideration measured values detected by the at least one further sensor.

3. The system according to claim 2, wherein said further sensor is an acceleration sensor for detecting acceleration as an emission signal, and wherein the system is configured to determine the operational state of the domestic appliance while also taking into consideration the acceleration.

4. The system according to claim 2, wherein said further sensor is an acoustic sensor for detecting a structure-borne sound and/or an airborne sound forming an emission signal, and wherein the system is configured to determine the operational state of the domestic appliance while also taking into consideration one or both of the structure-borne sound and the airborne sound.

5. The system according to claim 2, wherein said further sensor is a temperature sensor for detecting a temperature to which the outer face of the appliance housing is exposed as an emission signal, and wherein the system is configured to determine the operational state of the domestic appliance while also taking into consideration the temperature.

6. The system according to claim 1, wherein said retrofit module is configured to:
transmit the measured values of the emission signal by way of said data exchange unit to said communication device and/or to an Internet server, wherein the communication device and/or the Internet server is configured to determine the current operational state of the domestic appliance with the aid of the measured values received thereby; and/or
determine the operational state of the domestic appliance by way of the measured values of the at least one emission signal and to transmit the operational state of the domestic appliance to said communication device.

7. The system according to claim 1, which further comprises a plausibilization device configured to check whether the emission signals originate from the domestic appliance based on a comparison of the detected magnetic field and at least one emission signal different from the magnetic field, and to take the emission signals as a basis for determining the current operational state only after assignment to the domestic appliance.

8. The system according to claim 1, wherein said communication device is a portable terminal.

9. The system according to claim 1, wherein the system is configured to determine the current operational state of the domestic appliance on the basis of a comparison of the measured values of the magnetic field and/or at least one emission signal different from the magnetic field with stored reference values.

10. The system according to claim 1, wherein the system is configured, on the basis of the measured values of the magnetic field and/or at least one emission signal different from the magnetic field, to:
detect a currently selected operating program of the domestic appliance as an operational state; and/or
detect completion of the operating process as an operational state; and/or
determine a progress of a program and/or a remaining time of the operating process as an operational state.

11. The system according to claim 1, wherein said fastening arrangement comprises a magnet and/or a suction cup for releasably fastening the retrofit module on the domestic appliance.

12. The system according to claim 11, wherein said magnet is a permanent magnet.

13. The system according to claim 1, wherein the domestic appliance is a device for laundry care or a dishwasher.

14. A retrofit module for a system according to claim 1, the module comprising:
a fastening arrangement configured for releasably fastening the retrofit module on an outer face of an appliance housing of a domestic appliance;
a sensor arrangement configured to detect at least one emission signal from a component of the domestic appliance carrying out the operating process of the domestic appliance, the signal penetrating outwards through the appliance housing, said sensor arrangement having a magnetic field sensor disposed to detect a magnetic field, generated by a drive motor as the component of the domestic appliance, as an emission signal;
a data exchange unit for wireless communication with an external appliance that is separate from the retrofit module and from the domestic appliance;
a plausibilization device configured to check whether the emission signals originate from the domestic appliance based on a comparison of the detected magnetic field and at least one emission signal different from the magnetic field, and to take the emission signals as a basis for determining the current operational state only after assignment to the domestic appliance; and the retrofit module being configured:
to transmit detected measured values of the magnetic field by way of said data exchange unit to the external appliance to determine the current operational state of the domestic appliance; and/or
to determine, with the aid of the measured values of the magnetic field, the operational state of the domestic appliance and to transmit information regarding the operational state to the external appliance.

15. A retrofit module for a system according to claim 1, the module comprising:
a fastening arrangement configured for releasably fastening the retrofit module on an outer face of an appliance housing of a domestic appliance;
a sensor arrangement configured to detect at least one emission signal from a component of the domestic appliance carrying out the operating process of the domestic appliance, the signal penetrating outwards through the appliance housing, said sensor arrangement having a magnetic field sensor disposed to detect a magnetic field, generated by a drive motor as the component of the domestic appliance, as an emission signal;
a data exchange unit for wireless communication with an external appliance that is separate from the retrofit module and from the domestic appliance; and
the retrofit module being configured:
to transmit detected measured values of the magnetic field by way of said data exchange unit to the external appliance to determine the current operational state of the domestic appliance; and/or
to determine, with the aid of the measured values of the magnetic field, the operational state of the domestic appliance and to transmit information regarding the operational state to the external appliance; and/or
to detect, on the basis of a comparison of the measured values of the magnetic field and/or at least one emission signal different from the magnetic field with stored reference values, the operational error of the domestic appliance and to signal the error as the operational state to the communication device.

16. A system for monitoring a current operational state of a program-controlled domestic appliance while the domestic appliance is carrying out an operating process, the domestic appliance having an appliance housing and a drive motor, the system comprising:
a retrofit module;
a communication device that is separate from said retrofit module and from the domestic appliance;
said retrofit module including:
a fastening arrangement for releasable fastening said retrofit module on an outer face of the appliance housing of the domestic appliance;
a data exchange unit for wireless communication with the communication device; and
a sensor arrangement with a magnetic field sensor configured for detecting a magnetic field generated by the drive motor of the domestic appliance, the magnetic field forming an emission signal penetrating outwards through the appliance housing; and
wherein the system is configured to determine the current operational state of the domestic appliance by way of detected measured values of the emission signal and to output the current operational state by way of said communication device, and wherein the system is configured, on the basis of a comparison of the measured values of the magnetic field and/or at least one emission signal different from the magnetic field with stored reference values, to detect an operational error of the domestic appliance and to signal the error as the operational state to the communication device.

17. A method for monitoring a current operational state of a program-controlled domestic appliance while the domestic appliance is carrying out an operating process, the method comprising:
providing a retrofit module with a sensor arrangement, a data exchange unit and a fastening arrangement, the retrofit module including a plausibilization device;
mounting the retrofit module with the fastening arrangement to an outer face of an appliance housing of the domestic appliance;
detecting with a magnetic sensor of the sensor arrangement a magnetic field generated by a drive motor of the domestic appliance while carrying out the operating process of the domestic appliance, the magnetic field forming a emission signal penetrating outwards through the appliance housing;
using the plausibilization device of the retrofit module to check whether the emission signals originate from the domestic appliance based on a comparison of the detected magnetic field and at least one emission signal different from the magnetic field;
determining, based on measured values of the magnetic field detected by the magnetic field sensor, the current operational state of the domestic appliance, thereby taking the emission signals as a basis for determining the current operational state only after assignment to the domestic appliance; and
wirelessly communicating, by way of the data exchange unit, with a communication device separate from the retrofit module and from the domestic appliance and outputting information regarding the current operational state by way of the communication device.

18. A method for monitoring a current operational state of a program-controlled domestic appliance while the domestic appliance is carrying out an operating process, the method comprising:
providing a retrofit module with a sensor arrangement, a data exchange unit and a fastening arrangement;
mounting the retrofit module with the fastening arrangement to an outer face of an appliance housing of the domestic appliance;
detecting with a magnetic sensor of the sensor arrangement a magnetic field generated by a drive motor of the domestic appliance while carrying out the operating process of the domestic appliance, the magnetic field forming an emission signal penetrating outwards through the appliance housing;
determining the current operational state of the domestic appliance based a comparison of the measured values of the magnetic field and/or an emission signal different from the magnetic field with stored reference values;
wirelessly communicating, by way of the data exchange unit, with a communication device separate from the retrofit module and from the domestic appliance and outputting information regarding the current operational state by way of the communication device and when an operational error is detected on the basis of the comparison, signaling the operational error as the operational state to the communication device.

* * * * *